(12) United States Patent
Ray

(10) Patent No.: US 11,391,633 B2
(45) Date of Patent: Jul. 19, 2022

(54) HEAT REACTIVE TOILET SEAT ASSEMBLY

(71) Applicant: Sunshine Ray, Las Vegas, NV (US)

(72) Inventor: Sunshine Ray, Las Vegas, NV (US)

( * ) Notice: Subject to any disclaimer, the term of this patent is extended or adjusted under 35 U.S.C. 154(b) by 148 days.

(21) Appl. No.: 15/931,226

(22) Filed: May 13, 2020

(65) Prior Publication Data

US 2021/0356331 A1 Nov. 18, 2021

(51) Int. Cl.
*G01K 11/12* (2021.01)
*A47K 13/10* (2006.01)

(52) U.S. Cl.
CPC ............ *G01K 11/12* (2013.01); *A47K 13/105* (2013.01)

(58) Field of Classification Search
CPC ................................ G01K 11/12; A47K 13/105
See application file for complete search history.

(56) References Cited

U.S. PATENT DOCUMENTS

| 5,276,595 | A |   | 1/1994 | Patrie |   |
|---|---|---|---|---|---|
| 5,363,516 | A | * | 11/1994 | Butts | A47K 11/06 4/483 |
| 5,450,633 | A |   | 9/1995 | Semmler |   |
| 5,802,882 | A | * | 9/1998 | Girard | D04B 1/22 66/170 |
| 2001/0032354 | A1 | * | 10/2001 | Jarvis | A47K 17/00 4/245.4 |
| 2001/0037520 | A1 |   | 11/2001 | Farzanehfar |   |
| 2005/0071917 | A1 |   | 4/2005 | Landon |   |
| 2006/0249949 | A1 | * | 11/2006 | Fortune | G01K 11/12 283/72 |
| 2007/0161510 | A1 | * | 7/2007 | Spitzer | B41M 5/284 503/226 |
| 2007/0280331 | A1 | * | 12/2007 | Lin | G01K 11/12 374/162 |
| 2011/0267201 | A1 |   | 11/2011 | Bucha |   |
| 2012/0302323 | A1 | * | 11/2012 | Gagner | G07F 17/3202 463/25 |
| 2016/0107552 | A1 | * | 4/2016 | Wakeman | A47C 31/10 297/229 |
| 2021/0106189 | A1 | * | 4/2021 | Green | A47K 11/04 |
| 2021/0251047 | A1 | * | 8/2021 | Brook | H05B 3/12 |

FOREIGN PATENT DOCUMENTS

| WO | WO2006118276 |   | 9/2006 |
| ZA | 201001893 | * | 10/2011 |

* cited by examiner

*Primary Examiner* — J C Jacyna

(57) ABSTRACT

A heat reactive toilet seat assembly for integrating the novelty of a mood ring into a toilet includes a toilet seat that includes a thermochromic element thereby facilitating the toilet seat to change colors based on temperature. The toilet seat is hingedly coupled to a toilet for a user of the toilet to sit on. In this way the toilet seat is in thermal communication with the user for changing colors based on the user's body temperature in the convention of a mood ring. A lid is hingedly coupled to the ring thereby facilitating the lid to close the toilet. The lid includes a thermochromic element thereby facilitating the lid to change color based on temperature.

12 Claims, 5 Drawing Sheets

HEAT REACTIVE TOILET SEAT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to toilet seat devices and more particularly pertains to a new toilet seat device for integrating the novelty of a mood ring into a toilet.

(2) Description of Related Art including Information disclosed under 37 CFR 1.97 and 1.98

The prior art relates to toilet seat devices including a light emitter that is mounted to a toilet lid for illuminating a toilet at night. The prior art also discloses a toilet seat that has a pivoting hinge. The prior art also discloses a toilet seat that has flashing lights, a heater and musical functions.

BRIEF SUMMARY OF THE INVENTION

An embodiment of the disclosure meets the needs presented above by generally comprising a toilet seat that includes a thermochromic element thereby facilitating the toilet seat to change colors based on temperature. The toilet seat is hingedly coupled to a toilet for a user of the toilet to sit on. In this way the toilet seat is in thermal communication with the user for changing colors based on the user's body temperature in the convention of a mood ring. A lid is hingedly coupled to the ring thereby facilitating the lid to close the toilet. The lid includes a thermochromic element thereby facilitating the lid to change color based on temperature.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
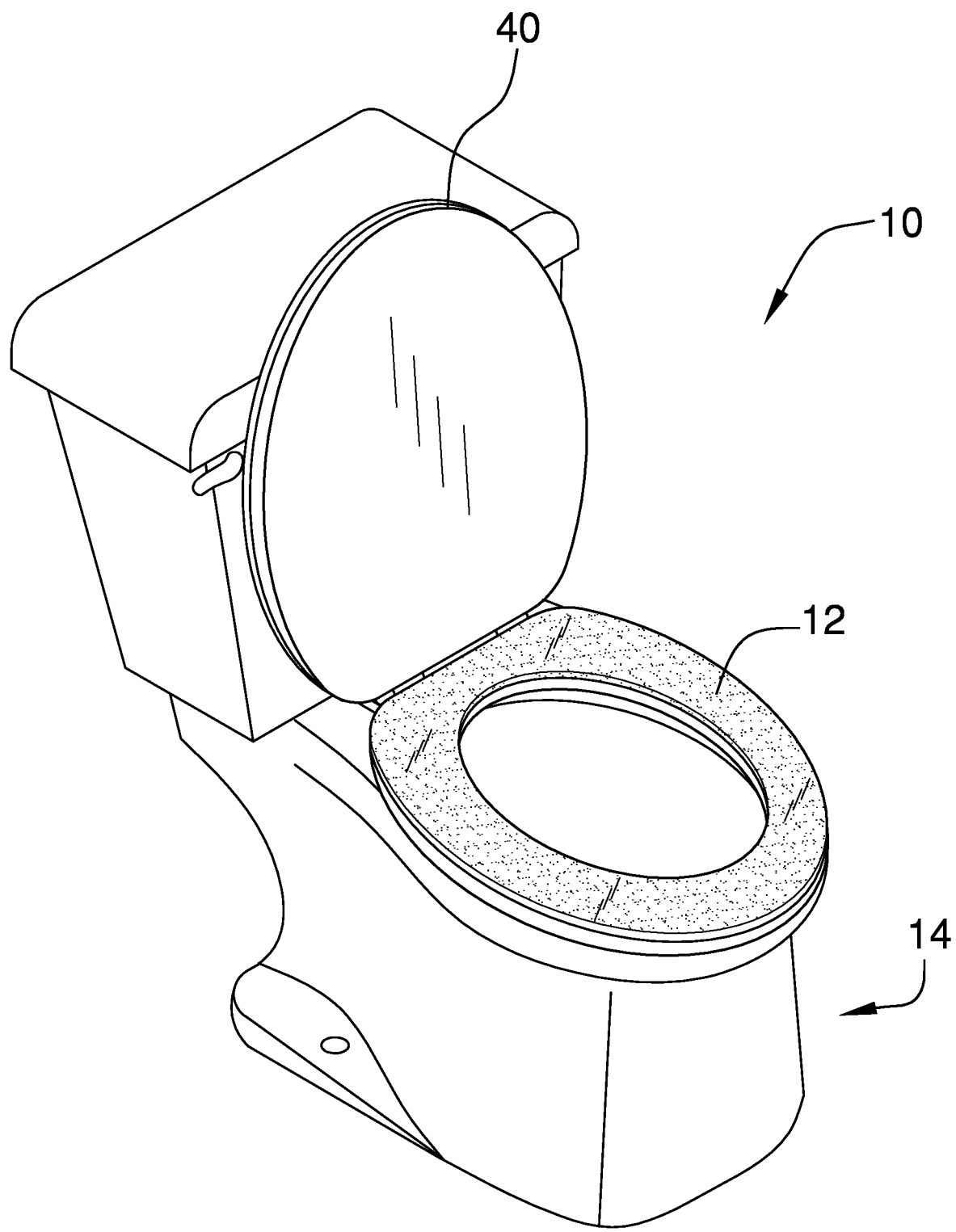
FIG. 1 is a perspective in-use view of a heat reactive toilet seat assembly according to an embodiment of the disclosure showing a lid in an open position.
Figure 2:
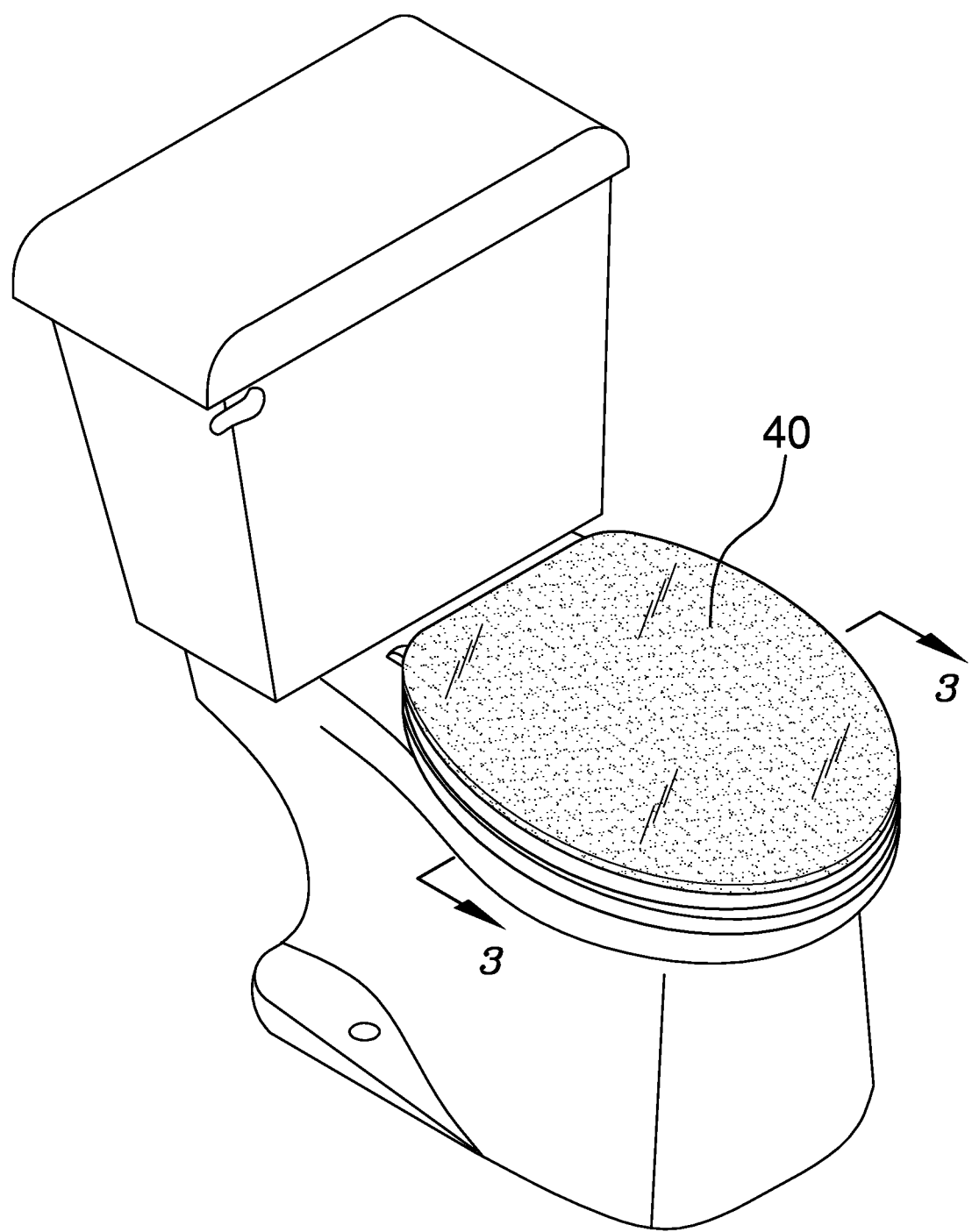
FIG. 2 is a perspective in-use view of an embodiment of the disclosure showing a lid in a closed position.
Figure 3:
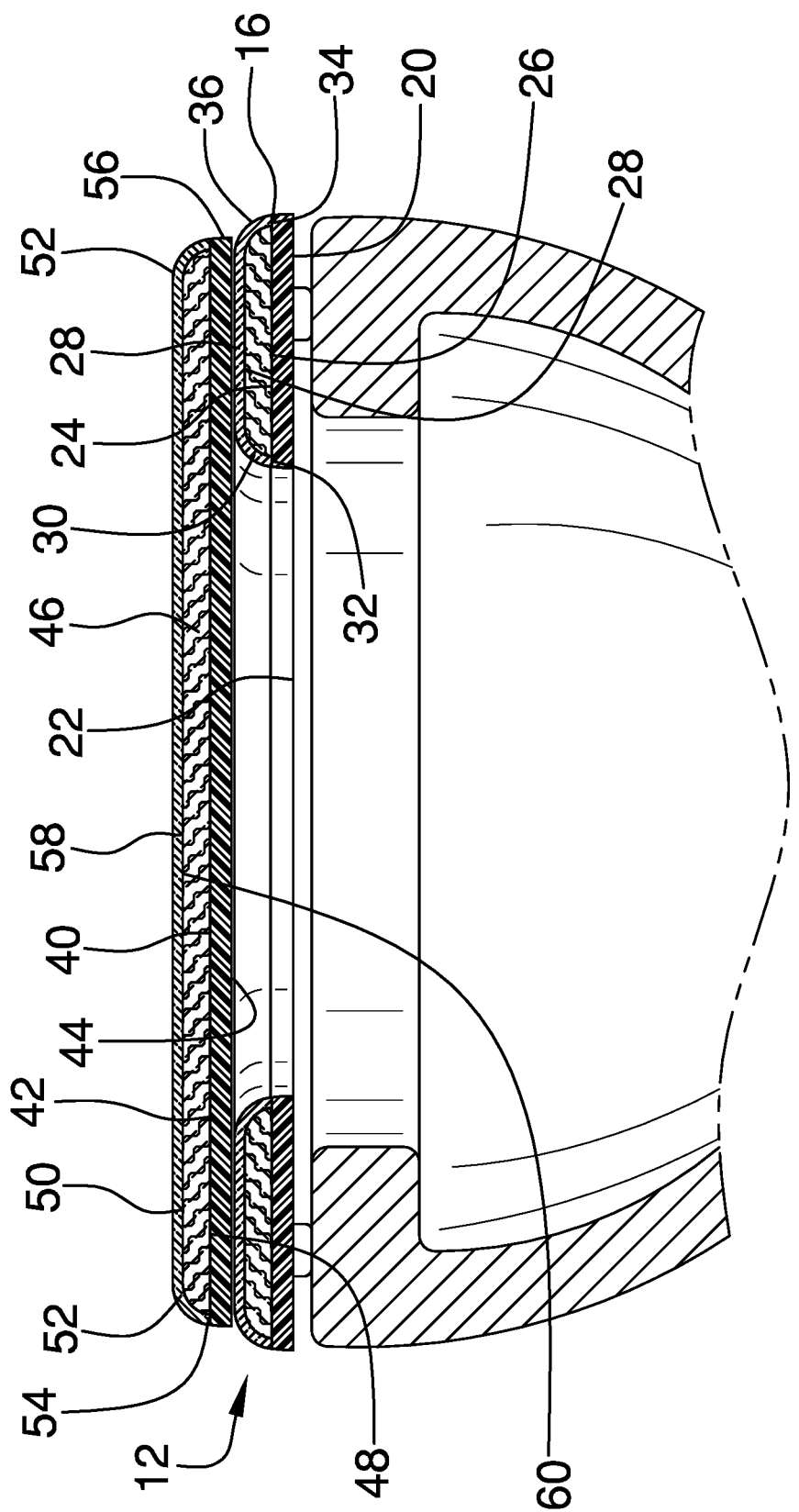
FIG. 3 is a cross sectional view taken along line 3-3 of FIG. 2 of an embodiment of the disclosure.
Figure 4:
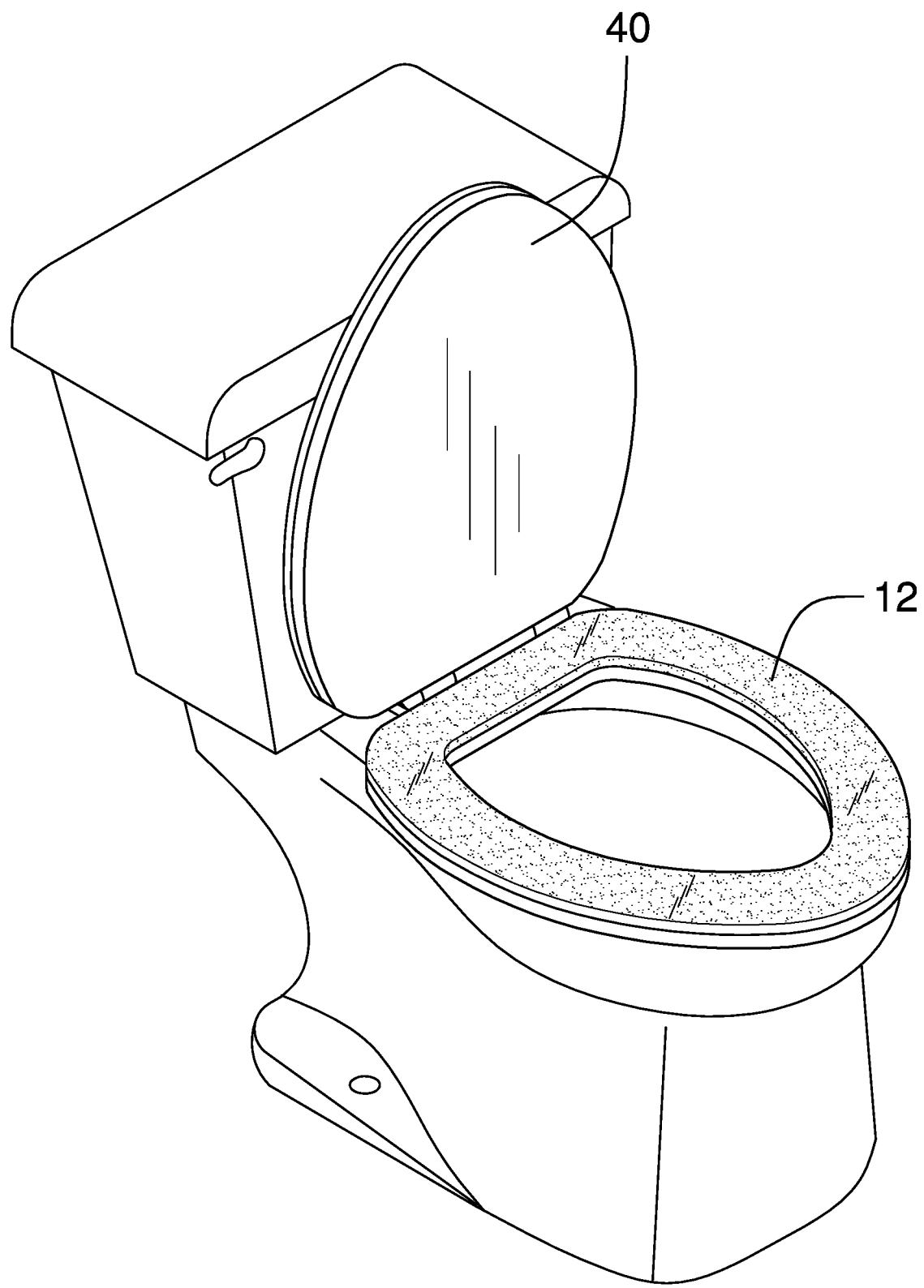
FIG. 4 is a perspective view of an embodiment of the disclosure showing a toilet seat with a flattened end.

With reference now to the drawings, and in particular to FIGS. 1 through 5 thereof, a new toilet seat device embodying the principles and concepts of an embodiment of the disclosure and generally designated by the reference numeral 10 will be described.

As best illustrated in FIGS. 1 through 5, the heat reactive toilet seat assembly 10 generally comprises a toilet seat 12 including a thermochromic element thereby facilitating the toilet seat 12 to change colors based on temperature. The toilet seat 12 is hingedly coupled to a toilet 14 such that a user of the toilet 14 sits thereon. In this way the toilet seat 12 is in thermal communication with the user for changing colors based on the user's body temperature in the convention of a mood ring. The toilet 14 may be a plumbing fixture in a residential bathroom or other similar type of toilet.

The toilet seat 12 comprises a ring 16 that has a top surface 18 and a bottom surface 20, and the bottom surface 20 faces a rim 22 of the toilet 14 when the toilet seat 12 is lowered. The toilet seat 12 includes a ring thermochromic member 24 that is positioned on the top surface 18 of the ring 16. In this way the ring thermochromic member 24 is in thermal communication with the user when the user sits on the ring 16.

The ring thermochromic member 24 is comprised of a thermochromic material thereby facilitating the ring thermochromic member 24 to change color based on temperature.

The ring thermochromic member 24 extends around a full circumference of the ring 16, and the ring thermochromic member 24 has a lower surface 26 and an upper surface 28. The lower surface 26 is bonded to the top surface 18 of the ring 16 and the lower surface 26 substantially covers the top surface 18. Additionally, the upper surface 28 is convexly arcuate with respect to the lower surface 26.

The toilet seat 12 includes a ring shield 30 that is positioned over the ring thermochromic member 24. The ring shield 30 is comprised of a translucent material thereby facilitating the ring thermochromic member 24 to be visible through the ring shield 30. Moreover, the ring shield 30 is comprised of a thermally conductive material thereby facilitating thermal communication between the ring thermochromic member 24 and the user when the user sits on the ring 16. The ring shield 30 has a first edge 32, a second edge 34, a topmost surface 36 and a bottommost surface 38. The bottommost surface 38 rests against the upper surface 28 of the ring thermochromic member 24, and each of the first edge 32 and the second edge 34 is bonded to the top surface 18 of the ring 16.

A lid 40 is provided that is hingedly coupled to the ring 16 thereby facilitating the lid 40 to close the toilet 14. The lid 40 includes a thermochromic element thereby facilitating the lid 40 to change color based on temperature. The lid 40 has a top surface 42 and a bottom surface 44, and the bottom surface 44 of the lid 40 faces the topmost surface 36 of the ring shield 30 when the lid 40 is closed.

The lid 40 includes a lid thermochromic member 46 that is positioned on the top surface 42 of the lid 40. The lid thermochromic member 46 is comprised of a thermochromic material thereby facilitating the lid thermochromic member 46 to change color based on temperature. The lid thermochromic member 46 substantially covers the top surface 18 of the lid 40. The lid thermochromic member 46 has a lower surface 48 and an upper surface 50, and the lower surface 48 of the lid thermochromic member 46 is bonded to the top surface 42 of the lid 40. The upper surface 50 of the lid thermochromic member 46 is convexly arcuate with respect to the lower surface 48 of the lid thermochromic member 46.

The lid 40 includes a lid shield 52 that is positioned over the lid thermochromic member 46. The lid shield 52 is comprised of a translucent material thereby facilitating the lid thermochromic member 46 to be visible through the lid shield 52. The lid shield 52 is comprised of a thermally conductive material thereby facilitating thermal communication between the lid thermochromic member 46 and the user when the user sits on the lid 40. The lid shield 52 has a first edge 54, a second edge 56, a topmost surface 58 and a bottommost surface 60. The bottommost surface 60 of the lid shield 52 rests against the upper surface 50 of the lid thermochromic member 46. Additionally, each of the first edge 54 and the second edge 56 of the lid shield 52 is bonded to the top surface 42 of the lid 40. As is most clearly shown in FIGS. 1 through 3, the toilet seat 12 and the lid 40 may have an ovoid shape. As is most clearly shown in FIG. 4, the toilet seat 12 may have a flattened end 62.

Figure 5:
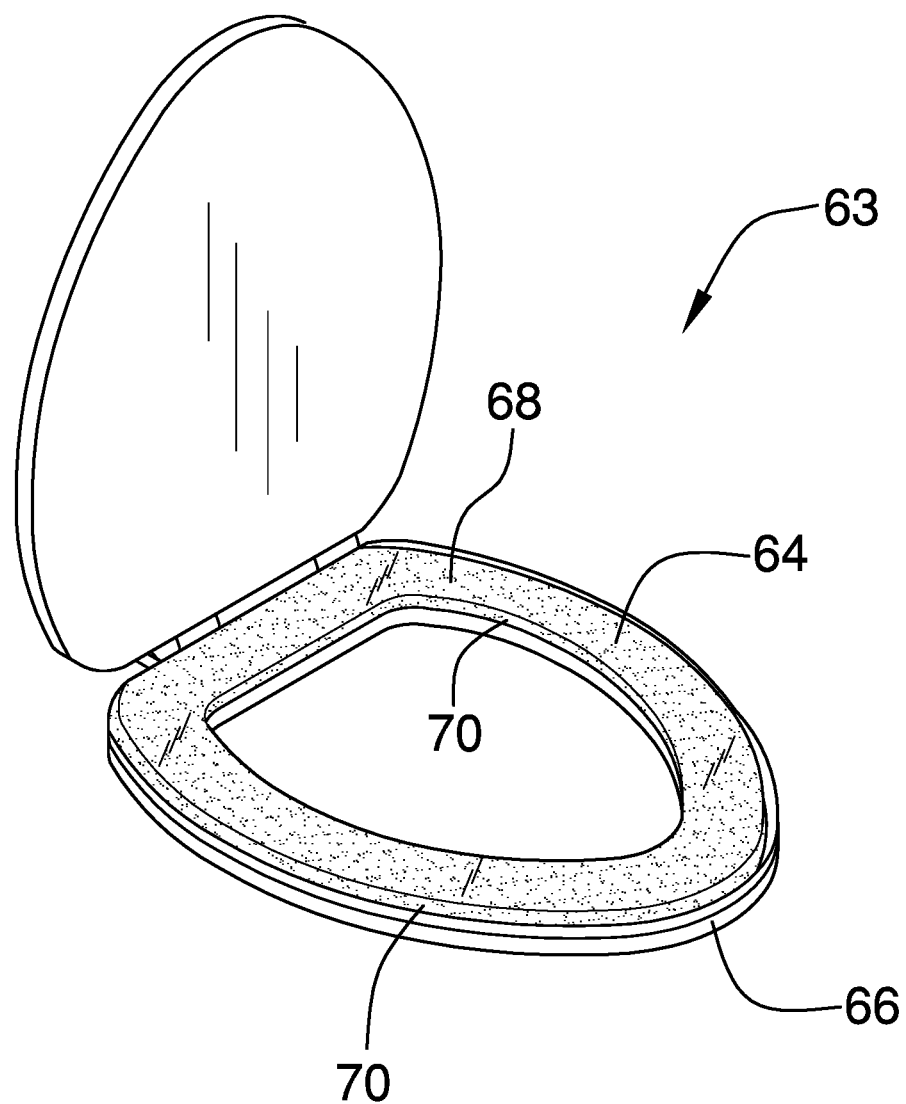
FIG. 5 is a perspective view of an alternative embodiment of the disclosure.

In an alternative embodiment 63 as is most clearly shown in FIG. 5, a cover 64 is provided that is positionable over an existing toilet seat 66 on an existing toilet 14. In this way the cover 64 is in thermal communication with the user when the user sits on the toilet seat 66. The cover 64 is comprised of a thermochromic material such that the cover 64 changes color based on the temperature of the user's body. In this way the novelty of a mood ring can be enjoyed on a toilet without requiring replacement of the factory installed toilet seat 66.

The cover 64 has an upper wall 68 and a pair of side walls 70 each extending downwardly from the upper wall 68. The upper wall 68 rests on the toilet seat 66 and each of the side walls 70 compresses against sides of the toilet seat 66 for retaining the cover 64 on the toilet seat 66. The cover 64 is continuous such that the cover 64 forms a closed ring thereby facilitating the cover 64 to conform to the shape of the toilet seat 66.

In use, the toilet seat 12 and the lid 40 are retrofitted onto an existing toilet 14. The toilet seat 12 changes color when the user sits on the toilet seat 12 due to the user's body heat being transferred into the toilet seat 12. In this way the toilet seat 12 facilitates a novelty display in the convention of a mood ring. Additionally, the lid 40 also changes color based on temperature. In this way the lid 40 will changes colors when the user sits on the lid 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A heat reactive toilet seat assembly for changing colors from a user's body heat for novelty purposes, said assembly comprising:

a toilet seat including a thermochromic element thereby facilitating said toilet seat to change colors based on temperature, said toilet seat being hingedly coupled to a toilet having a user of the toilet sitting thereon wherein said toilet seat is configured to be in thermal communication with the user for changing colors based on the user's body temperature in the convention of a mood ring;

a ring having a top surface and a bottom surface, said bottom surface facing a rim of the toilet when said toilet seat is lowered; and a lid being hingedly coupled to said ring thereby facilitating said lid to close the toilet, said lid including a thermochromic element thereby facilitating said lid to change color based on temperature.

2. The assembly according to claim 1, wherein said toilet seat comprises said thermochromic element being a ring thermochromic member being positioned on said top surface of said ring wherein said ring thermochromic member is configured to be in thermal communication with the user when the user sits on said ring.

3. The assembly according to claim 2, wherein said ring thermochromic member is comprised of a thermochromic material thereby facilitating said ring thermochromic member to change color based on temperature, said ring thermochromic member extending around a full circumference of said ring, said ring thermochromic member having a lower surface and an upper surface, said lower surface being bonded to said top surface of said ring, said lower surface substantially covering said top surface, said upper surface being convexly arcuate with respect to said lower surface.

4. The assembly according to claim 3, Wherein said toilet seat includes a ring shield being positioned over said ring thermochromic member, said ring shield being comprised of a translucent material thereby facilitating said ring thermochromic member to be visible through said ring shield, said ring shield being comprised of a thermally conductive material thereby facilitating thermal communication between said ring thermochromic member and the user when the user sits on said ring.

5. The assembly according to claim 4, wherein said ring shield has a first edge, a second edge, a topmost surface and a bottommost surface, said bottommost surface resting against said upper surface of said ring thermochromic member, each of said first edge and said second edge being bonded to said top surface of said ring.

6. The assembly according to claim 1, wherein:
said lid has a top surface and a bottom surface, said bottom surface of said lid facing said topmost surface of said ring shield when said lid is closed; and
said lid includes a lid thermochromic member being positioned on said top surface of said lid, said lid thermochromic member being comprised of a thermochromic material thereby facilitating said lid thermochromic member to change color based on temperature, said lid thermochromic member substantially covering said top surface of said lid.

7. The assembly according to claim 6, wherein said lid thermochromic member has a lower surface and an upper surface, said lower surface being bonded to said top surface of said lid, said upper surface of said lid thermochromic member being convexly arcuate with respect to said lower surface of said lid thermochromic member.

8. The assembly according to claim 7, wherein said lid includes a lid shield being positioned over said lid thermochromic member, said lid shield being comprised of a translucent material thereby facilitating said lid thermochromic member to be visible through said lid shield, said lid shield being comprised of a thermally conductive material thereby facilitating thermal communication between said lid thermochromic member and the user when the user sits on said lid.

9. The assembly according to claim 8, wherein said lid shield has a first edge, a second edge, a topmost surface and a bottommost surface, said bottommost surface of said lid shield resting against said upper surface of said lid thermochromic member, each of said first edge and said second edge of said lid shield being bonded to said top surface of said lid.

10. A heat reactive toilet seat assembly for changing colors from a user's body heat for novelty purposes, said assembly comprising:
a toilet seat including a thermochromic element thereby facilitating said toilet seat to change colors based on temperature, said toilet seat being hingedly coupled to a toilet having a user of the toilet sitting thereon wherein said toilet seat is configured to be in thermal communication with the user for changing colors based on the user's body temperature in the convention of a mood ring, said toilet seat comprising:
a ring having a top surface and a bottom surface, said bottom surface facing a rim of the toilet when said toilet seat is lowered;
said thermochromic element being a ring thermochromic member being positioned on said top surface of said ring wherein said ring thermochromic member is configured to be in thermal communication with the user when the user sits on said ring, said ring thermochromic member being comprised of a thermochromic material thereby facilitating said ring thermochromic member to change color based on temperature, said ring thermochromic member extending around a full circumference of said ring, said ring thermochromic member having a lower surface and an upper surface, said lower surface being bonded to said top surface of said ring, said lower surface substantially covering said top surface, said upper surface being convexly arcuate with respect to said lower surface; and
a ring shield being positioned over said ring thermochromic member, said ring shield being comprised of a translucent material thereby facilitating said ring thermochromic member to be visible through said ring shield, said ring shield being comprised of a thermally conductive material thereby facilitating thermal communication between said ring thenuochromic member and the user when the user sits on said ring, said ring shield having a first edge, a second edge, a topmost surface and a bottommost surface, said bottommost surface resting against said upper surface of said ring thermochromic member, each of said first edge and said second edge being bonded to said top surface of said ring; and
a lid being hingedly coupled to said ring thereby facilitating said lid to close the toilet, said lid including a thermochromic element thereby facilitating said lid to change color based on temperature, said lid having a top surface and a bottom surface, said bottom surface of said lid facing said topmost surface of said ring shield when said lid is closed, said lid including:
a lid thermochromic member being positioned on said top surface of said lid, said lid thennochromic member being comprised of a thermochromic material thereby facilitating said lid thermochromic member to change color based on temperature, said lid thermochromic member substantially covering said top surface of said lid, said lid thermochromic member having a lower surface and an upper surface, said lower surface being bonded to said top surface of said lid, said upper surface of said lid thermochromic member being convexly arcuate with respect to said lower surface of said lid thermochromic member; and
a lid shield being positioned over said lid thermochromic member, said lid shield being comprised of a translucent material thereby facilitating said lid thermochromic member to be visible through said lid shield, said lid shield being comprised of a thermally conductive material thereby facilitating thermal communication between said lid thermochromic member and the user when the user sits on said lid, said lid shield having a first edge, a second edge, a topmost surface and a bottommost surface, said bottommost surface of said lid shield resting against said upper surface of said lid thermochromic member, each of said first edge and said second edge of said lid shield being bonded to said top surface of said lid.

11. The assembly according to claim 10, further comprising a cover being positionable over said toilet seat on said toilet wherein said cover is configured to be in thermal communication with the user when the user sits on said toilet seat, said cover being comprised of a thermochromic material wherein said cover is configured to change color based on the temperature of the user's body.

12. The assembly according to claim 11, wherein said cover has an upper wall and a pair of side walls each extending downwardly from said upper wall, said upper wall resting on the toilet seat having each of said side walls compressing against sides of the toilet seat for retaining said cover on the toilet seat, said cover being continuous such that said cover forms a closed ring thereby facilitating said cover to conform to the shape of the toilet seat.

\* \* \* \* \*